United States Patent Office 3,008,927
Patented Nov. 14, 1961

3,008,927
PROCESS FOR THE CHLOROMETHYLATION OF AROMATIC VINYL POLYMERS
Hans Seifert, Bergisch-Neukirchen, Germany, assignor to Farbenfabriken Bayer Aktiengesellschaft, Leverkusen, Germany, a corporation of Germany
No Drawing. Filed Dec. 2, 1958, Ser. No. 777,593
Claims priority, application Germany Dec. 24, 1957
9 Claims. (Cl. 260—73)

The present invention relates to a process of producing chloromethylated aromatic vinyl polymers which products are valuable intermediates for the production of anion-exchange resins.

Chloromethyl methyl ether has assumed importance in the chloromethylation of compounds of high molecular weight and containing aromatic rings, such as, for example, polymers which may or may not be cross-linked and which contain benzene nuclei which can be chloromethylated. This substance can be prepared by various processes.

The yield and the quality of chloromethyl methyl ether which can be obtained from methylal are particularly favourable, and methylal can be obtained from methanol by a costly process. Chloromethyl methyl ether can also be prepared on a technical scale from methanol, formaldehyde and hydrochloric acid, but the yield of pure product is not very satisfactory. The chloromethylation of the aforementioned organic compounds of high molecular weight has so far been effected in a separate step, using the chloromethyl methyl ether in the presence of a Friedel-Crafts catalyst.

In addition, German patent specification No. 1,010,738 (as open to inspection) describes a process in which the formation of the chloromethyl methyl ether and the chloromethylation of aromatic vinyl polymers is effected in a single step. Chloromethyl methyl ether can be formed starting from methylal and paraformaldehyde, and using aluminum chloride as a hydrochloric acid donor. Aluminium chloride also has a catalytic action on the chloromethylation of the polymeric aromatic substances present in the reaction mixture. The reaction is strongly exothermic.

It has now been found that a smooth chloromethylation of the said vinyl aromatic polymers can be effected with methanol instead of with methylal which costs several times as much. The reaction proceeds in the presence of aluminium chloride, formaldehyde or a reversible polymer of formaldehyde, such as paraformaldehyde, in a substantially anhydrous inert medium with the development of only a very small heat of reaction at temperatures between 20° C. and 60° C. and reaction times of 10 to 20 hours. Advantageously, temperatures in the region of about 20° to 35° C. are employed.

At higher temperatures, the reaction times are considerably shortened, but in such cases there is the danger of the reaction proceeding with further cross-linking, due to the formation of methylene bridges between the aromatic nuclei. Consequently these products contain less chlorine.

All hydrocarbons which are neutral with respect to Friedel-Crafts catalysts, and preferably liquid chlorinated aliphatic hydrocarbons, such as ethylene chloride, methylene chloride, carbontetrachloride, tetrachloroethane, trichloroethylene, 1,1,2 trichloroethane, tetrachlorethylene, pentachloroethane, di-, tri-, tetra- and pentachloropropanes, tribromoethylene or mixtures thereof are to be considered for use as solvents or swelling agents.

Vinyl aromatic polymers which may be subjected to this chloromethylation process are well known in the art. There come into question linear polymers or copolymers of mono-vinyl aromatic compounds, such as styrene, vinyl toluene, vinyl anisole, vinyl pyridine, vinyl naphthalene, ethyl vinyl benzene, chlorostyrene, or copolymers of a major proportion of a mono-vinyl aromatic compound and a minor proportion of a mono-vinyl compound which does not contain aromatic nuclei, such as vinyl-chloride or acrylonitrile. Of primary importance for carrying through the present process are cross-linked vinyl aromatic polymers which are obtained by copolymerizing in known manner a predominant proportion of at least one aromatic vinyl compound, e.g. one of those cited above, and a subordinate proportion of a polyethylene unsaturated cross-linking agent, such as divinyl benzene, a substituted divinyl benzene (trivinyl benzene, divinyl toluene, divinyl xylene, divinyl ethyl benzene), divinyl ether, ethylene glycol methacrylate, ethylene glycol diacrylate, diallyl maleate, a polyester of a polyhydric alcohol and an olefinically unsaturated carboxylic acid, such as ethylene glycol and maleic acid. These copolymers can have both a gel structure and a sponge structure. The amount of cross-linking agent may vary within wide limits. In the case of copolymers having a gel structure, amounts of about 0.5–15 percent by weight of cross-linking agent as calculated on the amount of total monomers, and in the case of copolymers having a sponge structure, amounts of about 0.5–30 percent by weight are preferably used. Such copolymers are described, for instance, in U.S. patent specifications Nos. 2,591,573, 2,591,574, 2,614,099, 2,616,877, 2,629,710, 2,631,999, 2,632,000, 2,642,417, 2,725,361, 2,794,785 and in German patent application F 22,532 IVb/39b (Das 1.045.102).

These polymers and copolymers are characterized in that they contain aromatic nuclei, the carbon atoms of which constitute the major proportion of the total number of the carbon atoms of the polymer or copolymer.

In carrying through the chloromethylation process, the reaction components are preferably applied in the following quantities as calculated on one mol of the aromatic nuclei present in the polymer: 1–1.5 mols of aluminium chloride, 1–2 mols of formaldehyde, 1–4 mols of methanol. The inert solvents may be used in quantities ranging between about 2–8 parts by volume per one part by weight of polymer.

The chloromethylation products obtained by the present process contain about one chloromethyl group per 0.5–2 aromatic nuclei, usually one chloromethyl group per about one aromatic nucleus of the polymers. They are valuable intermediate products for the manufacture of anion exchangers. The products can be subjected to amination according to well known methods as they are, for instance, disclosed in U.S. patent specification No. 2,591,573.

*Example 1*

50 g. of a bead copolymer of 94 parts by weight of styrene and 6 parts by weight of divinyl benzene (diameter of beads about 0.3 to 0.5 mm.) are initially swelled for 30 minutes in 200 cc. of ethylene dichloride and then 30 g. of paraformaldehyde and 40 cc. of methanol are added thereto all at once. A total of 80 g. of anhydrous aluminium chloride is added thereto in small portions uniformly distributed over a period of 4 hours; the temperature at this time is kept between 20° C. and 30° C. and the mixture is stirred for 16 hours after the addition. After adding 500 cc. of water, the reaction mixture is filtered by suction, and the reaction product is washed with water and dried at 60° C. A light-yellow product with a chlorine content of 21.0% is obtained.

*Example 2*

50 g. of the copolymer of Example 1 are swelled in 200 cc. of ethylene dichloride and then within 10 minutes at 30° C., 15 g. of paraformaldehyde and 70 g. of anhydrous aluminium chloride are introduced therein. 20 cc.

of methanol are run into this suspension at 30° C. over a period of 4 hours; the mixture is stirred for 16 hours at 30° C. and worked up as described in Example 1. A reaction product which has a chlorine content of 10.5% is obtained.

Example 3

50 g. of the copolymer of Example 1 are swelled in 200 cc. of ethylene dichloride and 16.5 g. of paraformaldehyde and also 40 cc. of methanol are added thereto. A total of 70 g. of anhydrous aluminium chloride is introduced over a period of 4 hours at 30° C. and the mixture is stirred for 16 hours at 30° C. After working up, a product containing 11.6% of chlorine is obtained.

Example 4

50 g. of the copolymer of Example 1 are swelled in 200 cc. of ethylene dichloride and then 30 g. of paraformaldehyde and 40 cc. of methanol are added thereto. 80 g. of anhydrous aluminium chloride are introduced at 50–60° C. in small portions over a period not exceeding 4 hours and the mixture is stirred for 5 hours at the same temperature. The reaction product contains 16.1% of chlorine.

What I claim is:

1. Process for the chloromethylation of polymers of vinyl aromatic hydrocarbons which comprises contacting said polymers of vinyl aromatic hydrocarbons in an inert substantially anhydrous medium with a chloromethylating mixture consisting of anhydrous aluminium chloride, anhydrous formaldehyde and methanol to chloromethylate said polymers and isolating said chloromethylated polymers.

2. Process for the chloromethylation of polymers of vinyl aromatic hydrocarbons containing aromatic nuclei, the carbon atoms of which constitute the major proportion of the total number of the carbon atoms of the polymer which comprises contacting said polymers of vinyl aromatic hydrocarbons in an inert substantially anhydrous medium with a chloromethylating mixture consisting of about 1–1.5 mols of anhydrous aluminium chloride, 1–2 mols of anhydrous formaldehyde, and 1–4 mols of methanol per one mol of benzene nucleus present in the polymer, at temperatures between 20 and 60° C. to produce chloromethylated polymers, and isolating said chloromethylated polymers.

3. Process for the chloromethylation of polymers of vinyl aromatic hydrocarbons containing aromatic nuclei, the carbon atoms of which constitute the major proportion of the total number of the carbon atoms of the polymer which comprises swelling one part by weight of said polymer in about 2–8 parts by volume of an inert liquid halogenated aliphatic hydrocarbon and contacting said swelled polymer with a chloromethylating mixture consisting of about 1–1.5 mols of anhydrous aluminium chloride, 1–2 mols of anhydrous formaldehyde, and 1–4 mols of methanol per one mol of benzene nucleus present in the polymer, at temperatures between 20 and 60° C. to produce chloromethylated polymers and isolating said chloromethylated polymers.

4. Process according to claim 1, wherein said polymer of a vinyl aromatic hydrocarbon is a copolymer of a major proportion of a monovinyl aromatic compound and of a minor proportion of a monomer having several non-conjugated ethylenically unsaturated groups.

5. Process according to claim 2, wherein said polymer of a vinyl aromatic hydrocarbon is a copolymer of a major proportion of a monovinyl aromatic compound and of a minor proportion of a monomer having several non-conjugated ethylenically unsaturated groups.

6. Process according to claim 3, wherein said polymer of a vinyl aromatic hydrocarbon is a copolymer of a major proportion of a monovinyl aromatic compound and of a minor proportion of a monomer having several non-conjugated ethylenically unsaturated groups.

7. Process according to claim 1, wherein said polymer of a vinyl aromatic hydrocarbon is a copolymer of a major proportion of a monovinyl aromatic compound and a minor proportion of divinyl benzene.

8. Process according to claim 2, wherein said polymer of a vinyl aromatic hydrocarbon is a copolymer of a major proportion of a vinyl aromatic compound and a minor proportion of divinyl benzene.

9. Process according to claim 3, wherein said polymer of a vinyl aromatic hydrocarbon is a copolymer of a major proportion of a vinyl aromatic compound and a minor proportion of divinyl benzene.

References Cited in the file of this patent
UNITED STATES PATENTS

| | | |
|---|---|---|
| 2,642,417 | Wheaton | June 16, 1953 |
| 2,788,330 | Gilwood | Apr. 9, 1957 |